United States Patent [19]

Hamann

[11] 4,259,704

[45] * Mar. 31, 1981

[54] PROTECTIVE CIRCUIT FOR ZINC OXIDE VARISTORS

[75] Inventor: John R. Hamann, Richmond, Mass.

[73] Assignee: General Electric Company, N.Y.

[*] Notice: The portion of the term of this patent subsequent to Nov. 13, 1996, has been disclaimed.

[21] Appl. No.: 32,013

[22] Filed: Apr. 20, 1979

[51] Int. Cl.³ .............................................. H02H 7/16
[52] U.S. Cl. ......................................... 361/16; 361/57
[58] Field of Search ...................... 361/16, 15, 17, 57, 361/56, 54, 93, 94, 111, 110, 8, 13, 91; 338/20, 21, 92, 277

[56] References Cited

U.S. PATENT DOCUMENTS

| 2,072,717 | 3/1937 | Marbury | 361/16 |
| 2,363,898 | 11/1944 | Partington | 361/16 |
| 2,942,152 | 6/1960 | Stoelting | 361/16 |
| 3,619,721 | 11/1971 | Westendorp | 361/16 |
| 4,012,667 | 3/1977 | Ishida et al. | 361/15 X |
| 4,174,529 | 11/1979 | Hamann | 361/16 |

FOREIGN PATENT DOCUMENTS 860307  1/1941  France ...................................... 361/16

Primary Examiner—Patrick R. Salce
Attorney, Agent, or Firm—Richard A. Menelly; Francis X. Doyle

[57] ABSTRACT

The invention provides an improved circuit for determining rates of rise of energy in metal oxide varistor devices. A high voltage transformer is employed to trigger a protective air gap for bypassing the metal oxide varistor device. One application for the invention is for use within a series capacitor protective circuit.

7 Claims, 1 Drawing Figure

PROTECTIVE CIRCUIT FOR ZINC OXIDE VARISTORS

BACKGROUND OF THE INVENTION

Series capacitor protective equipment can employ a nonlinear zinc oxide varistor to limit the magnitude of the voltage across the protected series capacitor. Under normal operating conditions load currents flow through the series capacitor such that the voltage across the capacitor is the product of the load current and the capacitive reactance. The voltage withstand of the capacitor is selected such that the capacitor voltage caused by the flow of load current is well within the voltage withstand capability of the capacitor. The varistor characteristic is selected such that under normal load current conditions the varistor current is limited to a few milliamperes. When a fault condition, for example a line to ground fault, occurs on the transmission line in which the series capacitor is connected the current through the capacitor increases. The current increase causes the capacitor voltage to increase and if the capacitor voltage is sufficiently high its voltage withstand capability is exceeded. To prevent the occurrence of excess voltage across the capacitor the zinc oxide varistor provides an alternative path for the fault current causing the excess capacitor voltage. However, the current flow through the zinc oxide varistor during line fault conditions may cause damage to the varistor if allowed to continue for prolonged periods of time. Because excessive energy is dissipated in the varistors some means must be provided therefore for limiting the total energy dissipation within the varistor itself.

One means commonly employed to protect equipment from excess energy dissipation is the employment of a parallel air gap to bypass at least a part of the energy developed during a fault situation. One of the problems involved with the employment of triggered air gap devices is to determine when the rate at which the energy is dissipated within the equipment becomes excessive. When the rate at which energy is dissipated in the equipment is too high the gap will not have sufficient time to operate before the equipment fails.

U.S. patent application 894,529, filed Apr. 7, 1978, discloses a circuit wherein both the quantity of energy dissipated within the protected varistor and the rate at which the energy is dissipated are determined. However, it has since been found that the rate of energy dissipation per se can determine when the varistor current must be bypassed to prevent varistor failure. This is particularly true when the fault occurs relatively close to the protected varistors and there is relatively little transmission line inductance to provide a current limiting impedance to the fault current. The rate of rise of energy is a direct function of the fault current so that the fault current may be used to determine when the varistor energy dissipation rate is excessive.

SUMMARY OF THE INVENTION

This invention provides a simplified and improved circuit for detecting the rate of energy rise by sampling the fault current and providing a high voltage pulse to a triggered air gap to bypass the fault current from the varistors before varistor damage can occur.

DESCRIPTION OF THE PREFERRED EMBODIMENT

Figure 1:
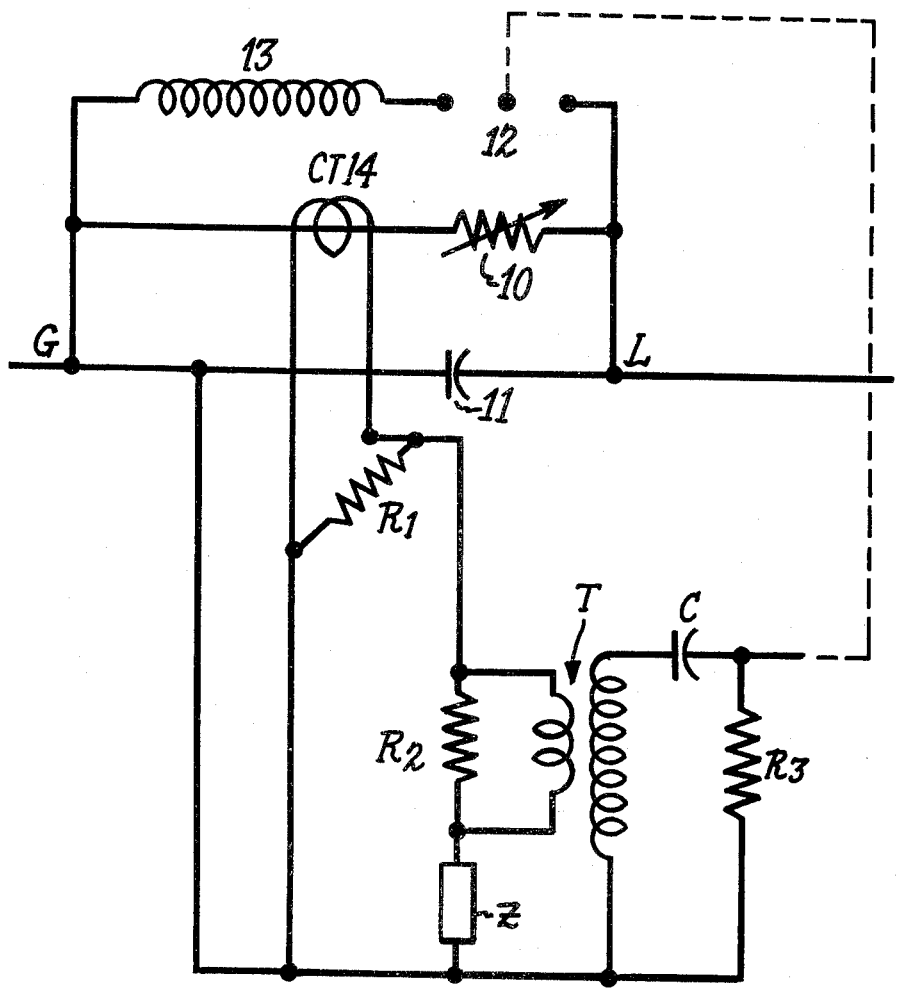
FIG. 1 is a block diagram representation of the improved series capacitor protective circuit of the invention.

FIG. 1 shows the improved series capacitor protective circuit used for protecting the series capacitor of a power transmission line. A metal oxide varistor 10 is electrically connected in parallel with the capacitor 11 in order to bypass current through capacitor 11 when the voltage across the capacitor is excessive. Excessive voltages develop, for example, when a line-to-ground fault occurs on the transmission line. A triggered air gap device 12 is electrically coupled in parallel with both the metal oxide varistor and the capacitor to bypass both the varistor and the capacitor when the magnitude or rate of energy dissipation within the varistor becomes excessive. An inductive element 13 is electrically connected in series with the air gap in order to limit the current through both the air gap and the capacitor when the air gap becomes conductive. A sensor device 14 is used to monitor the current through the varistor for providing input to a pulse transformer T which in turn provides high voltage pulses to the triggered air gap 12. The series capacitor protective circuit is coupled to the transmission line at terminal L and also at common terminal G.

The sensor circuit includes a current transformer CT monitoring the current through varistor 10 and for providing input to the pulse transformer only upon the occurrence of a fault condition on the transmission line.

Current transformer CT is connected across burden resistor $R_1$ and to one side of resistor $R_2$. The other side of resistor $R_2$ is coupled with nonlinear resistive element Z and one side of the low voltage winding of transformer T. The other end of nonlinear resistor Z is connected to ground. Nonlinear resistor Z comprises a zinc oxide varistor having a predetermined "turn on" voltage. Other switching elements such as zener diodes for example that are voltage dependent can also be employed.

The mechanism by which the above described circuit detects high rates of rise of energy within varistor 10 and generates low voltage pulses is described as follows. Because the rate at which energy is absorbed by varistor 10 is proportional to the current through the varistor, the rate at which energy is absorbed within the varistor can be determined from the crest magnitude of the varistor current. The varistor current is represented by a voltage which is developed across resistor $R_1$; therefore, the rate at which energy is dissipated in the varistor is represented by the crest voltage magnitude across resistor $R_1$. The magnitude of this voltage is sensed by the combination of resistor $R_2$, and nonlinear resistor Z. Nonlinear resistor Z is a voltage sensitive switch such as a varistor or zener diode. When the voltage across resistor $R_1$ is less than the turn-on voltage of nonlinear resistor Z, very little current flows through resistor $R_2$, and nonlinear resistor Z so that substantially all the voltage across resistor $R_1$ appears across Z. When the voltage across resistor $R_1$ is greater than the turn-on voltage of nonlinear resistor Z current flows through resistor $R_2$, and nonlinear resistor Z. The voltage in excess of the turn-on voltage of nonlinear Z appears across resistor $R_2$. The voltage across resistor $R_2$ is made small relative to the total voltage across resistor $R_1$ so that small voltage values in excess of the required turn-on voltage of nonlinear resistor Z will be sufficient to generate the required voltage pulses for transformer T. This increases the sensitivity of the circuit to small fault current increases over a predetermined value. The voltage across resistor $R_2$ is increased by means of transformer T to a value high enough to initiate the operation of triggered gap 12. Since the voltage across resistor $R_1$ varies over a wide range, a parallel nonlinear resistor can be connected across $R_2$ in order to limit the maximum voltage which appears across resistor $R_2$ and thereby prevent excessive voltage pulse magnitudes from damaging transformer T.

The voltage pulses which appear across the low voltage side of transformer T are in nearly exact electrical phase with the voltage developed across varistor 10. This means that the high voltage pulses developed by transformer T are in electrical phase with the voltage maxima which appear across triggered air gap 12. This electrical phase relationship is an important feature of the invention.

One lead of the high voltage winding of transformer T is connected to common terminal G, and to one side of resistor $R_3$. The other side of resistor $R_3$ is connected to one lead of capacitor C. The other lead of capacitor C is connected to the other terminal of the high voltage side of transformer T. Capacitor C and resistor $R_3$ form a high-pass filter which shapes the voltage wave which appears across the high voltage winding of transformer T. The voltage which appears across resistor $R_3$ is the signal that initiates the operation of triggered air gap 12.

Although the zinc oxide varistor protective circuit of the invention is disclosed for the purpose of protecting varistors in series capacitor applications on high voltage transmission lines this is by way of example only. The improved zinc oxide protective circuit of the invention finds application wherever zinc oxide varistors are to be protected.

What is claimed as new and which it is desired to secure by Letters Patent of the United States is:

1. An improved protective circuit for zinc oxide varistors of the type employing a triggered gap and high voltage means to trigger the gap upon the occurrence of a surge current and current sensing means for determining the occurrence of the current surge and for energizing the high voltage means wherein the improvement comprises:
a pair of first and second resistors and a voltage dependent switch connected to said current sensor and to one side of the high voltage means for providing voltage to said high voltage means when a voltage generated across one of said linear resistors exceeds a predetermined turn-on voltage for the voltage dependent switch.

2. The improved protective circuit of claim 1 wherein the current sensing means comprises a current transformer and said first resistor is connected across the output of the current transformer for generating a first voltage in response to current flow through the protected varistors.

3. The improved protective circuit of claim 2 wherein said second resistor is connected to said first resistor, said voltage dependent switch and across an input to said high voltage means for providing voltage across said high voltage means when said voltage dependent switch becomes conductive.

4. The circuit of claim 3 wherein said first resistor and said voltage dependent means are connected to one output from said high voltage means and another output from said high voltage means is connected to a triggered air gap for providing a high voltage pulse to said triggered air gap upon the occurrence of a surge current through said protected varistors.

5. The improved protective circuit of claim 4 wherein the high voltage means comprises a transformer and wherein a capacitor and wave-shaping resistor are connected in series across the outputs of said transformer to provide a high-pass filter between said transformer outputs and said triggered air gap.

6. The improved protective circuit of claim 1 wherein the voltage dependent switch is selected from the group consisting of varistors and zener diodes.

7. A method for protecting varistors from surge currents comprising the steps of:
providing a current sensing means within a circuit containing the varistors to be protected for sensing varistor current;
providing a first resistor across the output of the current sensing means for generating a voltage corresponding to said varistor current;
providing a series combination of a second resistor and a voltage sensitive switch across said first resistor for causing said switch to turn on when said voltage exceeds a predetermined turn-on voltage;
providing a transformer having an input and an output, said output being connected to a triggered air gap in shunt relation with said protected varistors for providing a shunt path to said varistor current when said triggered gap becomes energized; and
connecting said second resistor across the input of said transformer for energizing said transformer when said voltage switch turns on.

* * * * *